(12) United States Patent
Wu et al.

(10) Patent No.: US 10,884,134 B2
(45) Date of Patent: *Jan. 5, 2021

(54) TIMING CIRCUIT CALIBRATION

(71) Applicant: QUALCOMM Incorporated, San Diego, CA (US)

(72) Inventors: Jie Wu, San Diego, CA (US); Dominic Gerard Farmer, San Jose, CA (US); Lalitaprasad Daita, Fremont, CA (US); Emilija Simic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,360

(22) Filed: Feb. 10, 2020

(65) Prior Publication Data

US 2020/0174137 A1 Jun. 4, 2020

Related U.S. Application Data

(63) Continuation of application No. 14/845,781, filed on Sep. 4, 2015, now Pat. No. 10,557,944.

(60) Provisional application No. 62/069,242, filed on Oct. 27, 2014.

(51) Int. Cl.
  *G01S 19/23* (2010.01)
  *G01S 19/34* (2010.01)
  *G01S 19/39* (2010.01)

(52) U.S. Cl.
  CPC ............ *G01S 19/23* (2013.01); *G01S 19/235* (2013.01); *G01S 19/34* (2013.01); *G01S 19/39* (2013.01)

(58) Field of Classification Search
  CPC ........ G01S 19/23; G01S 19/235; G01S 19/34; G01S 19/39
  See application file for complete search history.

(56) References Cited

U.S. PATENT DOCUMENTS

| | | | |
|---|---|---|---|
| 5,594,453 A | 1/1997 | Rodal et al. | |
| 5,854,605 A | 12/1998 | Gildea | |
| 10,557,944 B2 * | 2/2020 | Wu | G01S 19/39 |
| 2003/0083814 A1 | 5/2003 | Gronemeyer et al. | |
| 2003/0176204 A1 | 9/2003 | Abraham | |
| 2004/0225439 A1 | 11/2004 | Gronemeyer | |

(Continued)

FOREIGN PATENT DOCUMENTS

| | | |
|---|---|---|
| CN | 103777217 A | 5/2014 |
| WO | 03038464 A2 | 5/2003 |

(Continued)

OTHER PUBLICATIONS

International Search Report and Written Opinion—PCT/US2015/057415—ISA/EPO—dated Jan. 27, 2016.

*Primary Examiner* — Olumide Ajibade Akonai
(74) *Attorney, Agent, or Firm* — Hunter Clark PLLC

(57) ABSTRACT

Disclosed are devices, systems and techniques for propagating a system time maintained at a mobile device in a lower power mode using a sleep counter advanced by an XO crystal oscillator. In one particular implementation, a mobile device obtains initial and subsequent satellite positioning system fixes while in a higher power mode. Between the initial and subsequent position fixes, the mobile device may transition to a lower power mode during which measurements of a temperature of the XO crystal oscillator may be obtained.

26 Claims, 7 Drawing Sheets

(56) References Cited

U.S. PATENT DOCUMENTS

| | | |
|---|---|---|
| 2010/0039316 A1 | 2/2010 | Gronemeyer et al. |
| 2010/0248678 A1 | 9/2010 | Babitch et al. |
| 2011/0102258 A1 | 5/2011 | Underbrink et al. |
| 2011/0156774 A1 | 6/2011 | Ge |
| 2011/0181367 A1 | 7/2011 | Satoh et al. |
| 2012/0065913 A1 | 3/2012 | Sasaki |
| 2012/0313817 A1 | 12/2012 | Underbrink et al. |
| 2013/0141279 A1 | 6/2013 | Suzuki |
| 2013/0154693 A1 | 6/2013 | Moeglein et al. |
| 2014/0006818 A1 | 1/2014 | Doshi et al. |
| 2016/0116598 A1 | 4/2016 | Wu et al. |

FOREIGN PATENT DOCUMENTS

| | | |
|---|---|---|
| WO | 2004055543 A1 | 7/2004 |
| WO | 2010125388 A1 | 11/2010 |
| WO | 2013090397 A2 | 6/2013 |

\* cited by examiner

TIMING CIRCUIT CALIBRATION

CROSS-REFERENCE TO RELATED APPLICATION

This application is a continuation of application Ser. No. 14/845,781, filed Sep. 4, 2015, entitled "TIMING CIRCUIT CALIBRATION," which claims the benefit of U.S. Provisional Application No. 62/069,242, filed Oct. 27, 2014, entitled "TIMING CIRCUIT CALIBRATION IN POWER MODES," each of which is assigned to the assignee hereof and expressly incorporated herein by reference for all purposes.

BACKGROUND

1. Field

The subject matter disclosed herein relates to electronic devices, and more particularly to methods, apparatuses and articles of manufacture for use in electronic devices that may selectively operate in different power modes.

2. Information

The Global Positioning System (GPS) and other like satellite positioning systems (SPSs) have enabled navigation services for devices in outdoor environments. Since some satellite signals may not be reliably received and/or acquired in an indoor environment, different techniques may be employed to enable position location and/or other like navigation services. In an indoor application, for example, certain devices may obtain a position fix by measuring ranges to terrestrial wireless access points (e.g., IEEE Std. 802.11 access points, etc.) that are positioned at known locations. Such ranges may be measured, for example, by obtaining a MAC ID address from signals received from such access points and measuring one or more characteristics of the received signals such as, for example, a signal strength, a round trip time (RTT) delay, a time of flight (TOF), just to name a few examples. In addition to SPSs and indoor positioning systems, existing wireless carrier infrastructures may enable observed time difference of arrival (OTDOA) and/or advanced forward link trilateration (AFLT) techniques for estimating locations of applicable devices. For example, with knowledge of the locations of neighboring base station transmitters and time-reference data, a device may estimate a range to such base station transmitters based upon an observed signal propagation delay (e.g., by comparing a phase value of an acquired signal to a time reference).

SUMMARY

Briefly, particular implementations are directed to a method comprising, with a mobile device operable in a plurality of power modes: obtaining an satellite position system (SPS) position fix including an SPS time; synchronizing a system time to the SPS time; while the mobile device is in a lower power mode over a time interval, obtaining three or more measurements of a temperature of at least one component of the mobile device at three or more time instances; estimating one or more frequencies of a sleep counter during the time interval based, at least in part, on the three or more measurements of the temperature of the at least one component of the mobile device during the time interval; and propagating the system time to an end of the time interval based, at least in part on the estimated one or more frequencies.

Another particular implementation is directed to a mobile device operable in a plurality of power modes comprising: a satellite positioning system (SPS) receiver; a timing circuit comprising a sleep counter; and one or more processors configured to: obtain an SPS time based, at least in part, on an SPS position fix from acquisition of signals at the SPS receiver; synchronize a system time to the SPS time; while the mobile device is in a lower power mode over a time interval; obtain three or more measurements of a temperature of at least one component of the mobile device at three or more time instances; estimate one or more frequencies of the sleep counter during the time interval based, at least in part, on the measurements of the temperature of the at least one component of the mobile device; and propagate the system time to an end of the time interval based, at least in part on the estimated one or more frequencies.

Another particular implementation is directed to a non-transitory storage medium comprising machine-readable instructions stored there on which are executable on one or more processors of a mobile device to: obtain an satellite position system (SPS) position fix including an SPS time; synchronize a system time to the SPS time; while the mobile device is in a lower power mode over a time interval, obtain three or more measurements of a temperature of at least one component of the mobile device at three or more time instances; estimate one or more frequencies of a sleep counter during the time interval based, at least in part, on the measurements of the temperature of the at least one component of the mobile device during the time interval; and propagate the system time to an end of the time interval based, at least in part on the estimated one or more frequencies.

Another particular implementation is directed to a mobile device comprising: means for obtaining an satellite position system (SPS) position fix including an SPS time; means for synchronizing a system time to the SPS time; while the mobile device is in a lower power mode over a time interval, means for obtaining three or more measurements of a temperature of at least one component of the mobile device at three or more time instances; means for estimating one or more frequencies of a sleep counter during the time interval based, at least in part, on the measurements of the temperature of the at least one component of the mobile device during the time interval; and means for propagating the system time to an end of the time interval based, at least in part on the estimated one or more frequencies.

It should be understood that the aforementioned implementations are merely example implementations, and that claimed subject matter is not necessarily limited to any particular aspect of these example implementations.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
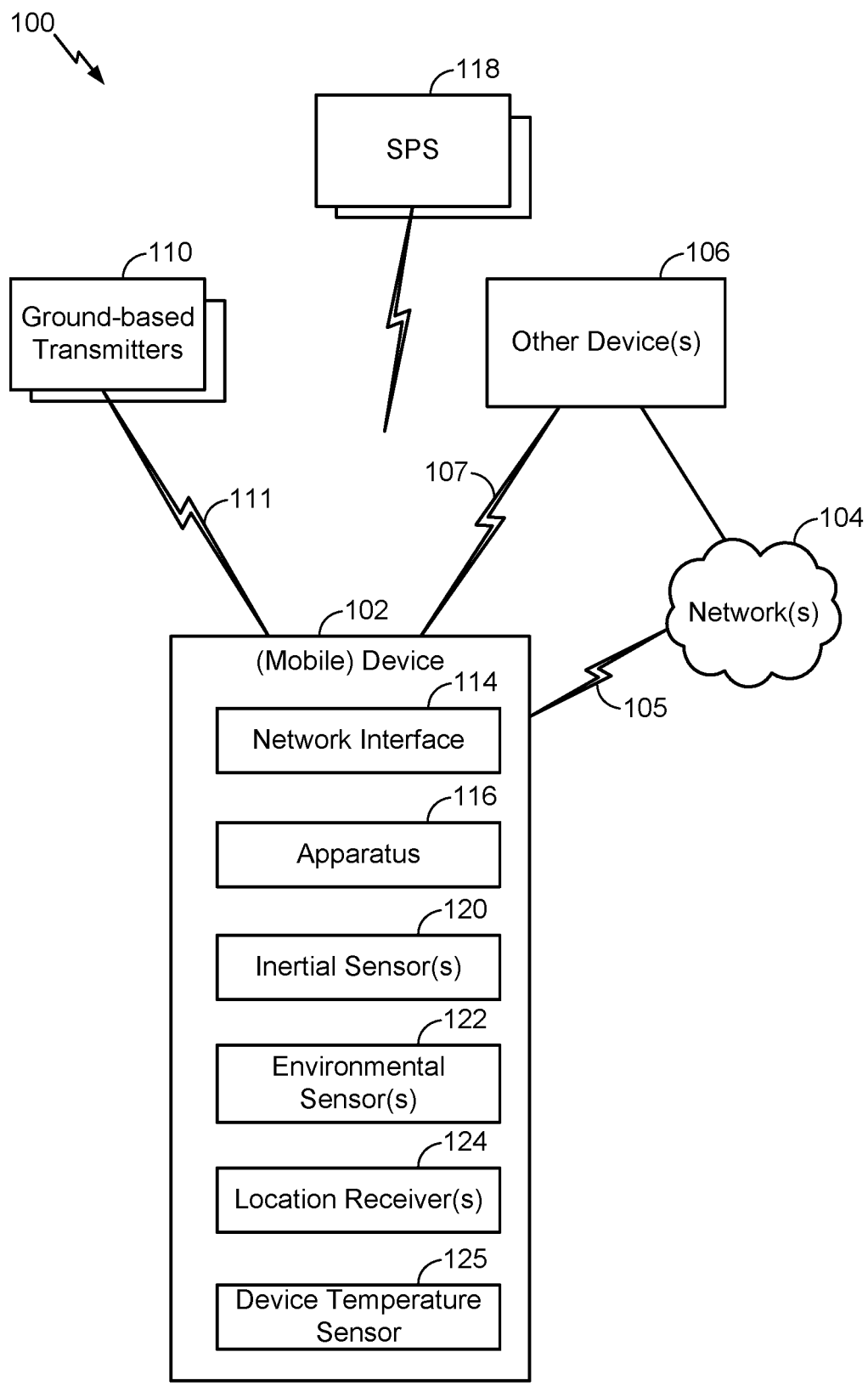
FIG. 1 is a schematic block diagram illustrating an example environment comprising a mobile device that conserves power by selectively transitioning between different operating modes, in accordance with an implementation.

While the above identified positioning techniques have been employed by mobile devices and other personal navigation devices, such positioning techniques may also be employed by other mobile devices and/or location tracking devices such as asset tracking tags, pet collars, child tracking tags, and/or the like. Thus, for example, a mobile device may obtain position fixes using one or more of the above techniques which may be followed by a transmission of a message to a location server (e.g., over a wireless cellular network) to report a most recent position, etc. As a location-enabled mobile device may have limited battery capacity and/or possibly a long expected deployment, it may be beneficial to conserve electrical power usage.

Techniques are provided herein which may be implemented in portable electronic devices capable of operating in a plurality of modes, in which certain modes may allow the device to conserve electrical power usage. Thus, certain example operational modes of a device may be considered as representing different power modes. For example, since a device may use different amounts of electrical power depending on its operational mode, one or more operational modes may be considered a "higher power mode" or "higher power state," one or more operational modes may be considered a "medium power mode" or "medium power state," and one or more operational modes may be considered "a lower power mode" or "lower power state." Here, as implied, a device operating in a higher power mode may use more electrical power than it might if it were operating in a medium power mode or a lower power mode. Similarly, a device operating in a medium power mode may use more electrical power than it might if it were operating in a lower power mode.

In a particular implementation, a receiver device may be in a lower power mode while at least a portion of clocks and circuits in the receiver device are turned off. In such a lower power mode, the receiver device may continue to apply power to a clock and circuitry sufficient to maintain coarse system time. For example, and as described below, during a lower power mode a "sleep clock" may advance a state of a "sleep counter" on cycles of signal generated by an XO crystal oscillator. A state of a sleep counter advanced while the receiver device is in a lower power mode may be used to estimate a system time.

As described in greater detail herein, in certain example implementations a device may operatively enable and disable certain components, circuits, and/or functions depending on its particular operational power mode or state. For example, in certain implementations with a device operating in a higher power mode the device may enable operation of one or more receivers, one or more transmitters, one or more sensors, etc. However, such an example device operating in a medium power mode may enable operation of one or more receivers and/or one or more sensors, but disable operation of one or more transmitters, etc. Further still, such an example device operating in a lower power mode may disable operation of one or more receivers, one or more sensors, one or more transmitters, etc., while enabling sufficient circuitry to at least allow the device to transition to another operational mode, e.g. at some later point in time.

With this in mind, various methods and apparatuses will now be described which may be used in a device to selectively transition the device from one power mode to another power mode in a manner which may promote conservation of electrical power in the device, e.g., to improve battery life.

To assist in acquisition of a signal for positioning operations (e.g., acquisition of a satellite positioning system (SPS) signal) a mobile device may apply acquisition windows determined based on an accurate estimate of time at a particular instant. In particular implementations, a mobile device in a reduced or lower power mode may attempt to propagate an estimate of time using a counter advanced by an XO crystal oscillator. In a particular implementation, an oscillation frequency of XO crystal oscillator may be affected by temperature, which may affect accuracy of an estimate of time propagated using an XO crystal oscillator. To correct for XO crystal oscillator jitter arising from fluctuating XO crystal oscillator temperatures, a mobile device may measure a temperature of the XO crystal oscillator as the state of a counter is being read. The measured temperature may indicate a change in XO crystal oscillation frequency and the change in XO crystal oscillator may be factored in propagation of an estimate of time.

In a particular implementation, an estimate of time may be propagated over intervals between consecutive SPS position fixes. For example, a system time may be updated from SPS time obtained from a first SPS position fix. Based on the updated system time, an estimate of the system time may be propagated according to an XO crystal oscillator until a mobile device resumes to a higher power mode and attempts to acquire a second SPS position fix based on the propagated estimate of system time. The propagated estimate may be determined based on a single observation of XO crystal oscillator temperature obtained immediately before acquisition of the second SPS position fix is attempted. This single observation of XO crystal oscillator temperature, however, may not account for fluctuations in XO crystal oscillator temperature occurring between the first and second SPS position fixes, which may affect accuracy of an estimate of system time propagated based on a sleep counter state advanced by the XO crystal oscillator. In this context, a "sleep counter" comprises a counter capable of advancing a sleep counter state to reflect advancement of a system time while a device is in a lower power mode or reduced power state.

According to an embodiment, a mobile device may obtain multiple observations of an XO crystal oscillator temperature while the mobile device is in a lower power mode between consecutive SPS position fixes. This may allow the mobile device to better account for fluctuations in temperature of the XO crystal oscillator temperature in adjusting for jitter in XO crystal oscillation frequency to propagate an estimate of system time for use in acquiring an SPS signal.

Attention is now drawn to FIG. 1, which is a schematic block diagram illustrating an example environment 100 that comprises an example device 102 having an apparatus 116 that may be used to transition device 102 between two or more operating modes, in accordance with an implementation.

As illustrated, environment 100 may also comprise one or more networks 104, one or more other devices 106, and one or more ground-based transmitters 110, all or some of which may be operatively coupled together via one or more wireless and/or wired communication links. Also illustrated is a representative satellite positioning system (SPS) 118, which may comprise a Global Navigation Satellite System (GNSS), Regional Navigation Satellite System (RNSS) (e.g., WAAS, EGNOS, QZSS, etc.) and/or the like, and which transmit signals that may be received by device 102 (e.g., via a location receiver 124) and used for position location processing. Such a GNSS may include, for example, systems or constellations in place or in planning and/or development phases, such as the U.S. GPS (Global Positioning System), Russian GLONASS (Global Orbiting Navigation Satellite System), European Galileo, Chinese Compass/BeiDou (BDS or BeiDou Navigation Satellite System), Indian IRNSS (Indian Regional Navigational Satellite System), and Japanese QZSS (Quazi Zenith Satellite System), just to provide a few examples. In particular implementations, transmitters in an SPS (e.g., transmitters on space vehicles) may transmit an encoded and synchronized signal ("SPS signal") that may be acquired by a receiver device of device 102 to obtain "pseudorange measurements." In a particular embodiment, acquisition of sufficient SPS signals may enable device 102 to obtain an "SPS position fix" including, for example, an estimate of a location of device 102 and a value for a current time referenced to time maintained by an SPS. Device 102 may then synchronize an internally maintained system time (e.g., maintained at a timing circuit 260 that may include one or more oscillators 261) to the value for the current time reference.

In certain example instances, transmitters 110 may transmit one or more wireless signals 111 that may be received by a network interface 114 and/or location receivers 124 of device 102. In certain example instances, other devices 106 may transmit one or more wireless signals 107 that may be received by network interface 114 of device 102, and/or receive one or more wireless signals 107 that may be transmitted by network interface 114. In certain example instances, other devices 106 may transmit one or more signals over a wired communication link with network(s) 104, and/or receive one or more signals over a wired communication link with network(s) 104. In certain example instances, network(s) 104 may transmit one or more wireless signals 105 that may be received by network interface 114 of device 102, and/or receive one or more wireless signals 107 that may be transmitted by network interface 114. In certain examples, signals 111 may comprise an 1×CDMA pilot signal, an EVDO pilot signal, an LTE pilot signal, an LTE PRS signal, a cellular communication network signal, a wireless communication network signal, a wide area network (WAN) signal, a wireless LAN signal (WLAN, WiFi, 802.11, etc.), a Bluetooth signal, a personal area network signal, LORAN, broadcast communication network signals, a wireless ad-hoc network communication signal (e.g., Zigbee, etc.), other terrestrial wireless signals, and/or the like.

It should be understood that the techniques provided herein may make use of various different types of signals 111 that may be transmitted by various different types of transmitters 110. Thus by way of some non-limiting examples one or more ground-based transmitters may, for example, transmit some form of a continuous pilot signal, some form of a time multiplex pilot signal, some form of an Orthogonal Frequency-Division Multiplexing (OFDM) pilot signal, some form of an asynchronous Beacon broadcast, some form of an Advanced Forward Link Trilateration (AFLT) pilot signal, some form of a Code Division Multiple Access (CDMA) pilot signal, a WAN positioning reference signal, some form of a cellular communication network signal, some form of a wireless communication network signal, some form of a wireless ad-hoc network communication signal, some form of a wireless broadcast network signal, some form of a navigation beacon signal, and/or the like, or just to name a few.

By way of example, device 102 may comprise any electronic device that may be moved about by a user and/or attached to some other object that may be transported about in some manner, and which comprises a network interface 114 for receiving signals transmitted by transmitters 110 (e.g., access points, cell towers, beacons, satellites, etc.) and/or possibly other resources in network(s) 104, etc. Thus, by way of some examples, device 102 may comprise a mobile device, such as, an asset tracking tag, a pet collar, a child tracking tag, and/or the like.

Apparatus 116 is representative of circuitry, such as, e.g., hardware, firmware, a combination of hardware and software, and/or a combination of firmware and software or other like logic that may be provided in device 102 and used, at least in part, to determine an operational power mode of device 102, e.g., as described herein.

Network(s) 104 may be representative of one or more communication and/or computing resources (e.g., devices and/or services) which device 102 may communicate with or through, e.g., via network interface 114 using one or more wired or wireless communication links. Thus, in certain instances device 102 may receive (or send) data and/or instructions via network(s) 104 such as WAN networks, WiFi access points and/or Wireless LAN networks, or personal area networks such as Bluetooth and/or Zigbee networks or wired networks such as local area networks and the Internet, or some combination thereof. In certain instances, device 102 may, for example, not only receive a signal from a transmitter 110, but may also transmit a signal to such a transmitter (e.g., having a receiver).

In certain example implementations, device 102 may be enabled to receive signals associated with one or more wireless communication networks, location services, and/or the like or any combination thereof which may be associated with one or more transmitters 110 and/or network(s) 104.

Device 102 may, for example, be enabled (e.g., via network interface 114) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

In certain example implementations, device 102 may be enabled, e.g., via network interface 114 or a location receiver 124, for use with various location service(s), such as, a GNSS, or other like satellite and/or terrestrial locating service, a location based service (e.g., via a cellular network, a WiFi network, etc.), and/or the like or some combination thereof.

One or more other devices 106 is illustrated as being connected to device 102 and/or network(s) 104 via one or more network interfaces (not shown), which in certain implementations may be similar to network interface 114. Other device 106 may, for example, comprise one or more computing platforms, one or more other devices, one or more appliances, one or more machines, and/or the like or some combination thereof. Apparatus 116 may, for example, obtain (e.g., via network interface 114) one or more attribute values, one or more motion constraint values, one or more profile tests, and/or the like or some combination thereof from one or more other devices 106.

Further, with apparatus 116 device 102 may, for example, determine one or more attribute values for one or more RF signals acquired by one or more receivers (e.g., in network interface 114, or one or more location receivers 124). With apparatus 116, device 102 may, for example, determine one or more attribute values for one or more inertial sensors 120 (e.g., accelerometers, gyrometers, gyroscopes, etc.), one or more environmental sensors 122 (e.g., magnetometers, compass, barometer, thermometer, temperature probes, stress gauge, microphone or other sound transducer, camera or other light sensitive sensors, etc.), and/or the like or some combination thereof. Device 102 may also comprise a device temperature sensor 125 for obtaining measurements of temperature of one or more components such as, for example, a temperature of an XO oscillator in timing circuit used for advancing a state of a sleep counter.

Figure 2:
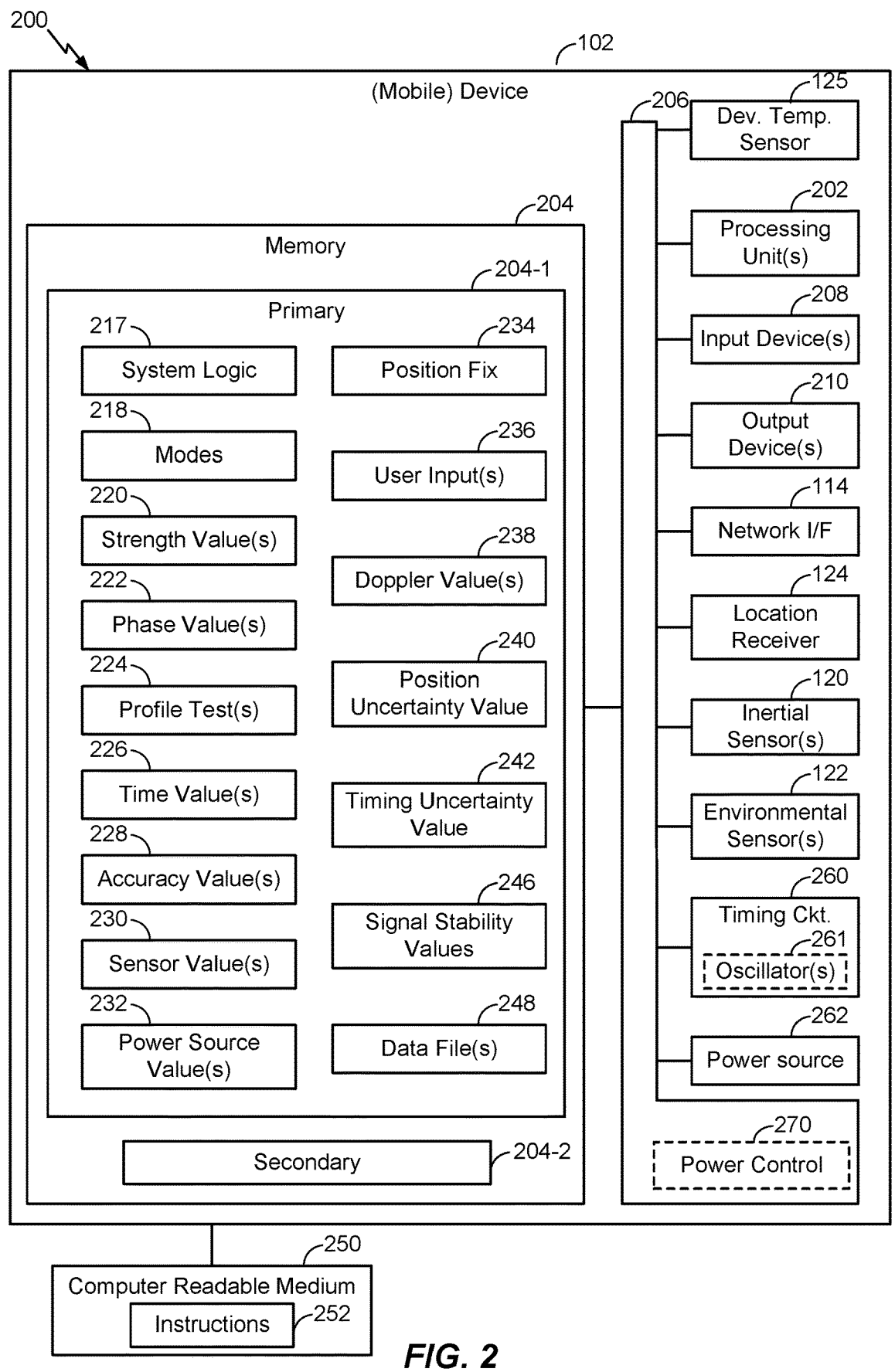
FIG. 2 is a schematic block diagram illustrating certain features of an example computing platform in the form of a mobile device to conserve power by selectively transitioning between different operating modes, in accordance with an implementation.

FIG. 2 is a schematic block diagram illustrating certain features of an example computing platform 200 shown in the form of device 102 for use in selectively transitioning between two or more operating modes in a manner that may conserve power, in accordance with an implementation.

As illustrated device 102 may comprise one or more processing units 202 to perform data processing (e.g., in accordance with the techniques provided herein) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within device 102. Secondary memory 204-2 may comprise, for example, the same or similar type of memory as primary memory and/or one or more data storage devices or systems, such as, for example, a disk drive, a solid state memory drive, etc. In certain implementations, secondary memory may be operatively receptive of, or otherwise configurable to couple to, computer readable medium 250. Memory 204 and/or computer readable medium 250 may comprise instructions 252 associated with data processing, e.g., in accordance with the techniques and/or apparatus 116 (FIG. 1), as provided herein.

Device 102 may, for example, further comprise one or more user input devices 208, one or more output devices 210, one or more network interfaces 114, one or more location receivers 124, one or more inertial sensors 120, and/or one or more environmental sensors 122. In certain example implementations, an environmental sensor 122 may comprise a camera or some other form of a light sensitive sensor or photo detector, a microphone, a gas or smoke detector, a temperature probe, and/or the like.

Input device(s) 208 may, for example, comprise various buttons, switches, a touch pad, a trackball, a joystick, a touch screen, a microphone, a camera, and/or the like, which may be used to receive one or more user inputs. Output devices 210 may, for example, comprise various devices that may be used in producing a visual output, an audible output, and/or a tactile output for a user.

A network interface 114 may, for example, provide connectivity to one or more transmitters 110 and/or network(s) 104 (FIG. 1), e.g., via one or more communication links. Location receiver 124 may, for example, obtain signals from one or more location services, SPS, etc. (not shown), which may be used in estimating a location of device 102 at certain times.

Processing unit(s) 202 and/or instructions 252 may, for example, provide or otherwise be associated with one or more encoded electrical signals stored in memory 204, such as, system logic 217. At various times memory 204 may comprise one or more encoded electrical signals representing in some manner one or more modes 218, one or more signal strength values 220, one or more signal timing phase values 222, one or more profile tests 224, one or more time values 226 (e.g., associated with period time, a date, a schedule, a timer, etc.), one or more accuracy values 228 (e.g., associated with a time, a position, etc.), one or more sensor related attribute values 230 (e.g., associated with one or more measurements from one or more inertial or environmental sensors), one or more power source values 232 (e.g., associated with an available remaining power, used power, power consumption, certain threshold power level settings/indicators, etc.), one or more position fixes 234 (e.g., geographical or other map coordinates, velocity, altitude, ranges, etc.), one or more user inputs 236 (e.g., mode selections, mode overrides, mode preferences, on/off, etc.); one or more frequency Doppler values 238, one or more position uncertainty values 240, one or more time uncertainty values 242, one or more signal stability values 246, and/or all or part of one or more almanac, a neighbor list, or other like data compilation(s)/file(s) 248, etc., and/or the like or any combination thereof, e.g., as described in the various example techniques herein.

As further illustrated in FIG. 2, device 102 may comprise a timing circuit 260, which as described in various examples herein may be used when device 102 is in a lower power mode. Timing circuit 260 may generate a clock signal for use in a lower power mode. By way of example, timing circuit 260 may comprise an XO crystal oscillator and/or the like which may be used to advance an internal clock time, counter or estimate of a system time (e.g., between synchronization of the clock time with a reference time). Additionally, device 102 may comprise one or more power sources 262. By way of example, in certain instances a power source 262 may comprise a battery.

As illustrated simply by way of representation, a power control 270 may be provided in whole or part via connections 206 and/or elsewhere within device 102. Power control 270 may be response to processing unit 202 (e.g., running apparatus 116) to selectively enable or disable one or more circuits, receivers, transmitters, chips, sensors, interfaces, etc, within device 102 in some manner. Thus, for example, power control 270 may selectively power-up or power-down all or part of a circuit, etc., to enable or disable it in some manner, e.g., as may be defined by an operational mode. Hence, for example, power control 270 may power-down or other wise disable to some extent all or part of location receiver 124 and/or network interface 114 with device 102 in a lower power mode. Additionally, for example, power control 270 may power-up or other wise enable all or part of location receiver 124 and/or a receiver and/or a transmitter of network interface 114 with device 102 in another mode, e.g., a higher power mode or a medium power mode. Accordingly, power control 270 may comprise various hardware, firmware, and/or other like logic, such as, e.g., switches, logic gates, etc., that may serve to disable and/or enable various circuitry within device 102 and which may or may not be used depending on the operational mode of device 102.

Figure 3:
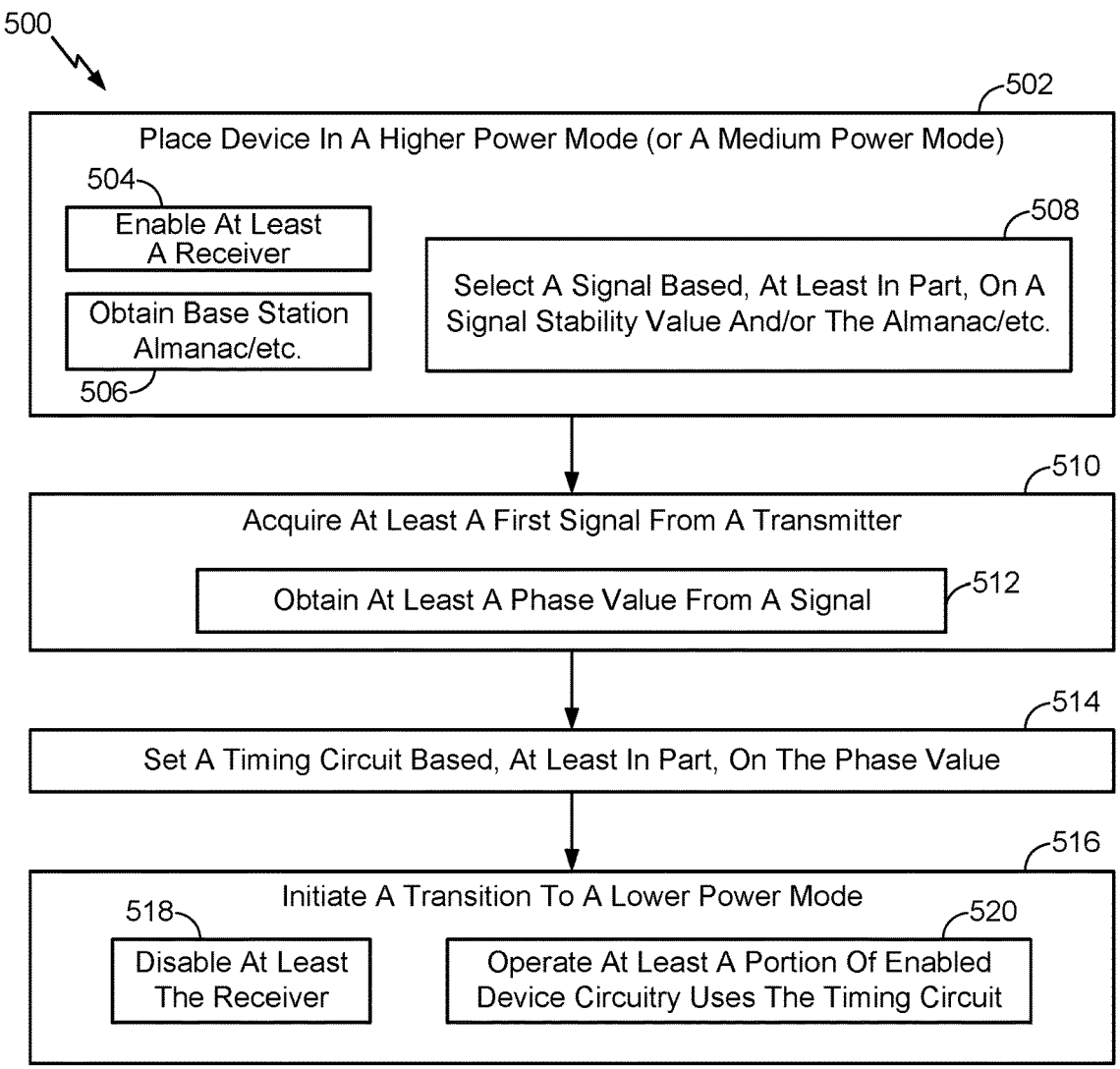
FIG. 3 is a flow diagram illustrating certain features of an example process or method for use in a device to selectively transition between different operating modes and set a timing circuit used in at least one of the modes, in accordance with an implementation.

FIG. 3 is a flow diagram illustrating certain features of an example process or method 500 for use at a device 102 to set a timing circuit that may be used with the device operating in a lower power mode, in accordance with an implementation.

At example block 502, a device may be placed in a higher power mode, or a medium power mode. As such, for example, at example block 504, at least one receiver may be enabled for use.

In certain example implementations, at block 506, a base station almanac and/or other like information may be obtained. In certain example implementations, at block example 508, one or more RF signals may be selected (e.g., for searching and possibly acquisition by one or more enabled receivers) based, at least in part, on one or more expected signal stability values and/or obtained information such as in one or more obtained base station almanacs, etc., or some portion thereof.

For example, a device may select one or more specific signals to acquire from one or more space-based transmitters (e.g., GNSS transmitters) or one or more ground-based transmitters based, at least in part, on a comparison of corresponding signal stability values for available or expected signals. By way of example, a signal stability value may comprise or otherwise be based, at least in part, on: a type of received signal, a received signal strength measurement, a received signal phase drift measurement, a received signal frequency, a received signal frequency stability, a received signal availability measurement, a transmitter position uncertainty, a transmitter range, a transmitter power, a type of transmitter, a type of transmitter antenna, and/or the like or some combination thereof.

A device may obtain and use all or part of a base station almanac and/or other like data compilation (e.g., for at least one of the plurality of ground-based transmitters), and select one or more signals based, at least in part, on the base station almanac, as a cellular and/or other like "neighbor list", and/or other like data compilation(s)/file(s).

In certain example implementations, a device may combine or otherwise process almanac information or the like with its own clock state to determine an expected time and/or frequency window in which to search for signals transmitted from ground-based and/or satellite-based transmitters. For example, a time window may indicate a time at which the signal is more likely to be useful, and/or may indicate be a time at which a particular phase of a signal is expected, e.g., to reduce search uncertainty. Likewise, similar techniques may be used to reduce a frequency uncertainty. For example, if a device is likely to be indoors, it may be unlikely to have a high rate of speed. Thus, an expected Doppler uncertainty due to device motion may be reduced. Likewise, growth in device position and clock uncertainty may be reduced, as well, e.g., as a direction function of the characterized environment or as a function of parameters derived from the environment characterization. A rate of growth of such example uncertainties may be factored into a determination as to an operating mode that the device may consider transitioning to at some point.

At example block 510, a device may acquire at least a first signal from a transmitter (e.g., ground-based transmitter or GNSS transmitter). At example block 512, a device may determine at least a phase value for the first signal. At example block 514, a device may set or otherwise operatively affect a timing circuit (e.g., used with the device operating in a lower power mode) based, at least in part, on a phase value, e.g., from example block 512. In the specific case where a signal from a GNSS transmitter is being acquired at block 510, positioning assistance data and/or ephemeris (e.g., locally stored in a memory) may be used to acquire the signal.

At example block 516, a device may initiate a transition placing the device in a lower power mode. Here, as previously described, a device operating in a lower power mode may consume less electrical power than it does while operating in a higher power mode or a medium power mode (and possibly certain other power modes). At example block 518, a device may disable at least one receiver or some portion thereof (e.g., GNSS/SPS modem or processor) which may have been enabled with the device in the higher power mode. At example block 520, at least a portion of enabled device circuit may be operated using a timing circuit as possibly set at block 514. For example, at least a portion of a processing unit or other corresponding logic circuitry may receive a clock signal or other like signal(s) from the timing circuit with the device in a lower power mode.

Figure 4:
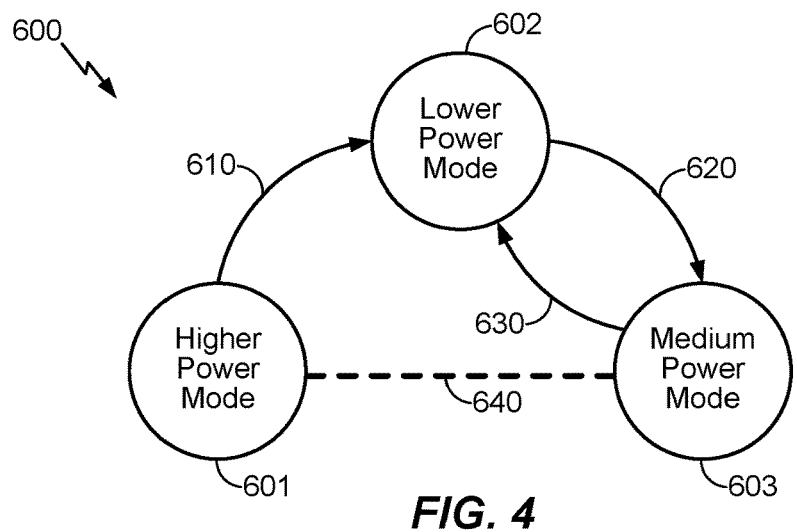
FIG. 4 is a diagram illustrating certain features of an example mode transitioning scheme that may be implemented in a device to conserve power, in accordance with an implementation.

Reference is made next to FIG. 4, which is a diagram illustrating certain features of an example mode transitioning scheme 600 that may be implemented in device 102 (FIG. 1) to conserve power, in accordance with an implementation.

Here, for example, device 102 may be placed in a higher power mode 601, and as such may receive and transmit wireless signals. In certain instances, higher power mode 601 may represent a fully powered on mode, an initial start-up mode, etc. Device 102 may transition, between higher power mode 601 and a lower power mode 602, e.g., in response to certain conditions represented by conditional arrow 610. For example, arrow 610 transitioning device 102 from higher power mode 601 to lower power mode 602 may represent processes to initiate a transition to a lower power mode at block 516, disable a receiver at block 518 or operate at least a portion of enabled device circuitry that uses the timing circuit at block 520 (FIG. 3). Hence, for example, with device 102 in lower power mode 602 wireless signals may not be received or transmitted by device 102. In certain instances, lower power mode 602 may represent a sleep mode which may reduce power consumption in comparison to higher power mode 601.

As illustrated by dashed line 640, in certain implementations, higher power mode 601 may comprise medium power mode 603. For example, higher power mode 601 may permit device 102 to receive wireless signals, use various sensors, etc., as might medium power mode 603. As such, conditional arrow 620 may similarly represent a transition from lower power mode 602 to higher power mode 601, and conditional arrow 630 may represent a transition (similar to that of conditional arrow 610) from higher power mode 601 to lower power mode 602. Indeed, in certain example implementations, device 102 may simply have two modes of operation, namely, higher power mode 601 and lower power mode 602, which conditional arrows applied as above.

In certain example implementations, a timing circuit 260 (FIG. 2) may be referenced to an external time and/or frequency source, which may also enable easier acquisition of a signal modulated by a reference clock signal (e.g., GPS satellite signals, CDMA cellular signals, OFDM cellular signals, etc.) which may be used to obtain a position fix. Upon acquisition of such a signal, a device 102 (FIG. 1) may then synchronize timing circuit 260 to a reference clock signal.

Particular example implementations of device 102 may employ an XO crystal oscillator (not shown) to advance and/or other operatively affect an internal clock time that may be provided by timing circuit 260. As XO crystal oscillators tend to be inexpensive but power efficient, they are typically not very accurate, e.g., necessitating frequent acquisition of an external signal for re-synchronization of internal system clock time with a reference time. An XO crystal oscillator may oscillate at a frequency estimated according to expression (1) as follows:

$$f=f_0[1-a(T-T_0)^2] \quad (1)$$

Where $f_0$, a and $T_0$ are process parameters; and T is the temperature of the oscillator. In one particular implementation, a value for a of 0.04 ppm is used. However, it should be understood that in other implementations, different values (higher or lower) may be used.

Expression (1) above provides a second order computation of a frequency estimate. Other implementations may comprise a third order computation of an estimated frequency of an XO crystal oscillator according to expression (2) as follows:

$$f=c_3(T-T_0)^3+c_2(T-T_0)^2+c_1(T-T_0)+c_0, \quad (2)$$

where $T_0$, $c_0$, $c_1$, $c_2$ and $c_3$ are process parameters.

Here, it should be understood that expressions (1) and (2) are merely examples of how an estimated frequency of an XO crystal oscillator may be computed, and that these two examples are not intended to be exhaustive. Furthermore, it should be understood that claimed subject matter is not limited to any particular technique for computing an estimated frequency of an XO crystal oscillator, and that claimed subject matter is not limited to the particular example techniques of expressions (1) and (2).

Without knowledge of T, $f_0$ and $T_0$ for an implementation according to expression (1) or knowledge of T, $c_0$, $c_1$, $c_2$, $c_3$ and $T_0$ for an implementation according to expression (2) one can only expect to typically achieve about 100 ppm accuracy. In addition, as the crystal ages, $c_0$, $c_1$, $c_2$, $c_3$, $f_0$ and $T_0$ may tend to drift. Some methods for improving accuracy of an XO crystal oscillator include temperature compensation (TOXO), heating (forcing a temperature—OCXO) and even microprocessor control. The latter case simply uses a microprocessor in place of the analog circuitry of the TOXO wherein the oscillator temperature is measured and the crystal's frequency is "pulled" toward a nominal frequency.

According to an implementation, a device time clock of timing circuit 260 may be advanced by an XO crystal oscillator in periods between events to synchronize the device time clock with a reference time (e.g., through acquisition of an SPS signal, signal transmitted from a cellular base station, AFLT pilot, other reference signal with low frequency drift, etc.). During these periods between synchronization events, a temperature of the oscillator may be intermittently measured using a sensor (e.g., to obtain T) for obtaining an estimate of the oscillator's frequency drift. The measured frequency drift may then be accumulated for estimating clock drift from the previous synchronization event. In one example implementation, a temperature sensor may be intermittently activated for obtaining sample measurements of the oscillator's temperature.

Also, at a synchronization event for obtaining a reference time (e.g., through acquisition of a GPS signal) a clock time which has been corrected from sampling oscillator temperature may be compared with the reference time (which is assumed to have no error) to obtain a clock error. This clock error may then be used for updating estimates of process parameters $c_1$, $c_2$, $c_3$, $f_0$ and $T_0$ for use in computing an estimate of f as shown above.

In certain example implementations, a device may define at least three modes: a first mode which may enable circuitry to acquire signals for obtaining a position fix and/or synchronize a device clock time with a reference clock; a second mode which may enable the oscillator to advance the device clock time; and a third mode which may enable a temperature sensor for sampling the temperature of the oscillator. Between events to synchronize the device clock with a reference time (e.g., by acquiring a signal as discussed above) the device may be intermittently "awakened" from the second mode to the third mode to obtain a temperature measurement sample. A temperature measurement sample or other like corresponding temperature value may be used for estimating an oscillator frequency drift and/or the like, which in turn may be accumulated for adjusting a device clock time of timing circuit 260.

One example process may comprise: (a) estimating parameters $f_0$ and $T_0$; (b) using signals with device in a first mode to zero out a timing error (e.g., synchronize with a reference time) and then disabling the receiver; (c) transitioning to a second mode (e.g., to sleep for a second or two) and using the oscillator of timing circuit 260 to advance clock time; (d) transitioning to a third mode and measuring an oscillator temperature; (e) calculating an "instantaneous frequency" f over a short period; (f) accumulating a drift in frequency from the instantaneous frequency to compute a correction to clock time; (g) repeating (c) through (f) for a period of time (e.g., several minutes); (h) transitioning to a first mode to re-acquire signal(s) to obtain a time reference (e.g., a phase value); (i) comparing the clock time to the time reference to determine error; (j) using the error to re-synchronize the time clock and update estimates of $f_0$ and $T_0$; and (k) possibly repeating (b) through (k).

According to an embodiment, a mobile device may be maintained in a low power mode during which, for example, certain functions are powered down. For example, a mobile phone may be maintained in a sleep state that is interrupted periodically with short periods in which a receiver may acquire a signal (e.g., a paging slot to acquire a paging signal from a cellular transmitter). In one particular implementation, for example, on five second periods a mobile phone may briefly awaken for a 90-100 msec duration to acquire paging signal. While the mobile device is in a lower power mode such as a sleep state, the mobile device may maintain a sleep counter (e.g., in timing circuit 260) to be used in propagating time maintained by a system clock. As pointed out above, having an accurate system clock time may enable the mobile device to obtain estimates of its location by acquiring GNSS signals with a small search window, enabling a fast time-to-fix.

In a particular implementation, a mobile device in a sleep state or lower power mode may operate such that power may be removed from a wireless transceiver (e.g., WWAN or cellular transceiver) and/or other components. In such a lower power mode, a wireless transceiver may not have full functionality to receive signals from and transmit signals to a wireless network, but functionality may be quickly restored by fully powering the device. While a wireless transceiver may have a reduced functionality in such a lower power mode, in an embodiment a mobile device may have an SPS receiver that is powered to acquiring signals while the mobile device is in the lower power mode. As such, during a sleep state or lower power mode a process on the mobile device may be capable of issuing a request to perform an SPS position fix and an SPS receiver may be capable of fulfilling this request even if the mobile device is in the lower power mode. Having an accurate system clock time available as the SPS receiver receives a request while the mobile device is in the lower power mode may enable the small search window and corresponding fast time-to-fix.

As pointed out above, a particular power mode of a mobile device may be determined based on whether particular components of the mobile device are powered off or placed in a reduced power mode. In an example, a mobile device may have specific components dedicated to obtaining an SPS position fix, among other things. For example, a mobile device may comprise a modem and/or processor dedicated to acquiring and processing SPS signals for obtaining a position fix. In one particular embodiment, a mobile entering a lower power mode or sleep state may remove power from such a modem and/or processor. While in such a lower power mode of sleep state, the mobile device may continue to provide power to timing circuitry to propagate an estimate of a system time using an XO crystal oscillator, and measure a temperature of the XO crystal oscillator to account for changes in an oscillating frequency of the XO crystal oscillator.

According to an embodiment, a system clock value of a mobile device may be propagated while the mobile device is in a lower power mode according to expression (3) as follows:

$$SCT_{c2}=SCT_{c1}+\Delta T \quad (3)$$

Where:

$SCT_{c1}$ is a beginning system clock time (e.g., at a time where a mobile device enters lower power mode such as a sleep state);

$SCT_{c2}$ is a propagated system clock time; and $\Delta T$ is an amount that a system time is propagated.

According to an embodiment, an amount of time that a system clock is propagated $\Delta T$ may be computed based, at least in part, a change in a state of a counter that is incremented on increment cycles from a start time (e.g., entering a sleep state) and an end time (e.g., servicing a request for an SPS position fix) according to expression (4) as follows:

$$\Delta SCT=(C2-C1)T_{sc}, \quad (4)$$

where:

$T_{sc}$ is an increment cycle of a sleep counter;

C1 is a state or value of a sleep counter at an instance that a mobile device enters a sleep state; and C2 is a state of value of a sleep counter at an end time.

In a particular implementation, a sleep clock uncertainty may be assumed to be 100 ppm. As discussed herein uncertainty in an XO-based sleep clock based on a sleep counter state may be significantly reduced by obtaining multiple samples of XO temperature over a time period. At any particular sample, a frequency f of an XO oscillator of a sleep counter may be estimated using expressions (1) or (2) discussed above.

According to an embodiment, obtaining a GNSS position fix may enable a mobile device to synchronize a system clock time SCT to an SPS time (e.g., GPS time). Estimating an instantaneous frequency of an XO oscillator based on temperature according to expression (1) or (2) above may enable a mobile device to propagate a system clock time according to the estimated instantaneous frequency. However, if there is significant variation in XO oscillator temperature between $SCT_{c1}$ and $SCT_{c2}$, a propagated system clock time to $SCT_{c2}$ based on an instantaneous frequency estimate (e.g., from a single temperature sample) may deviate significantly from an SPS time that was synchronized to $SCT_{c1}$. According to an embodiment, a system clock time may be propagated based on an average temperature between $SCT_{c1}$ and $SCT_{c2}$. The average temperature may then be used to compute a frequency according to expressions (1) or (2) to be used in computing an increment cycle of a sleep counter $T_{sc}$ for use in propagating system clock time. As described below, temperature may be sampled at multiple instances between $SCT_{c1}$ and $SCT_{c2}$. A combination of these temperatures, such as an average, may be used for computing a frequency using expressions (1) or (2).

Figure 5:
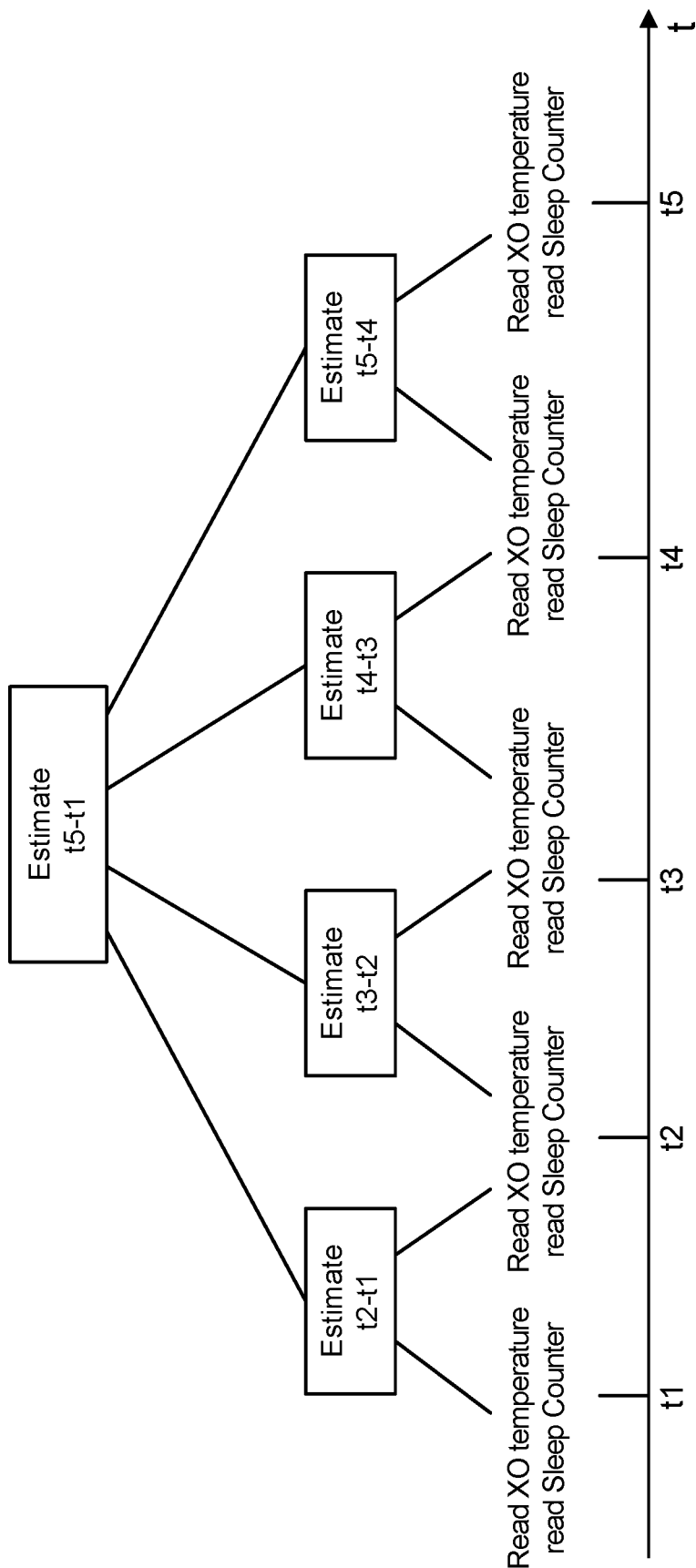
FIG. 5 shows use of multiple measurements of temperature for propagation of a system time according to an embodiment.

According to an embodiment, a sleep counter state may be calibrated (e.g., based on variations of an oscillating frequency of an XO crystal oscillator advancing the sleep counter) on set period (e.g., performed every P seconds) while a mobile device is in a lower power mode or sleep state. As illustrated in FIG. 5, temperature of an XO oscillator may be measured at multiple instances at times t1 through t5. In one example embodiment, times t1 though t5 may be estimated during a time interval while the mobile device is in a sleep state or reduced power mode following a first event in which a system time is synchronized with an SPS time (e.g. GPS time) at a first position fix and before a second event when the mobile device attempts a second position fix.

According to an embodiment, a rate of change in a temperature of the XO oscillator may be estimated based on two or more temperature measurements. For example, a rate at which measurements are to be obtained may be increased in response to a detection of an increase in an estimated rate of change in temperature. Likewise, a rate at which measurements are to be obtained may be decreased in response to a detection of a decrease in an estimated rate of change in temperature. Furthermore, a rate at which measurements are to be obtained may be increased in response to particular events (e.g., system interrupts) likely to accompany a rapid increase in temperature (e.g., a processor or other component awakening from a sleep state).

In one implementation, an average temperature between consecutive measurements may be computed (e.g., between t1 and t2, or between t2 and t3). This average temperature may be determined by adding the first and second measurements and dividing by two. A frequency of the XO oscillator may then be computed according to expressions (1) or (2) above and system time may be propagated to the time of the latest measurement. Here, system time may be propagated incrementally from t1 to t2, t2 to t3, t3 to t4 and t4 to t5. In another implementation, system time may be propagated from time t1 or earlier to t5 in one iteration. Here, temperature measurements obtained at t1 through t5 may be used to compute single expression or value for an XO crystal oscillator temperature (e.g., average temperature). From the single expression or value for temperature, an oscillation frequency for the XO crystal oscillator may be estimated using expressions (1) or (2).

Figure 6:
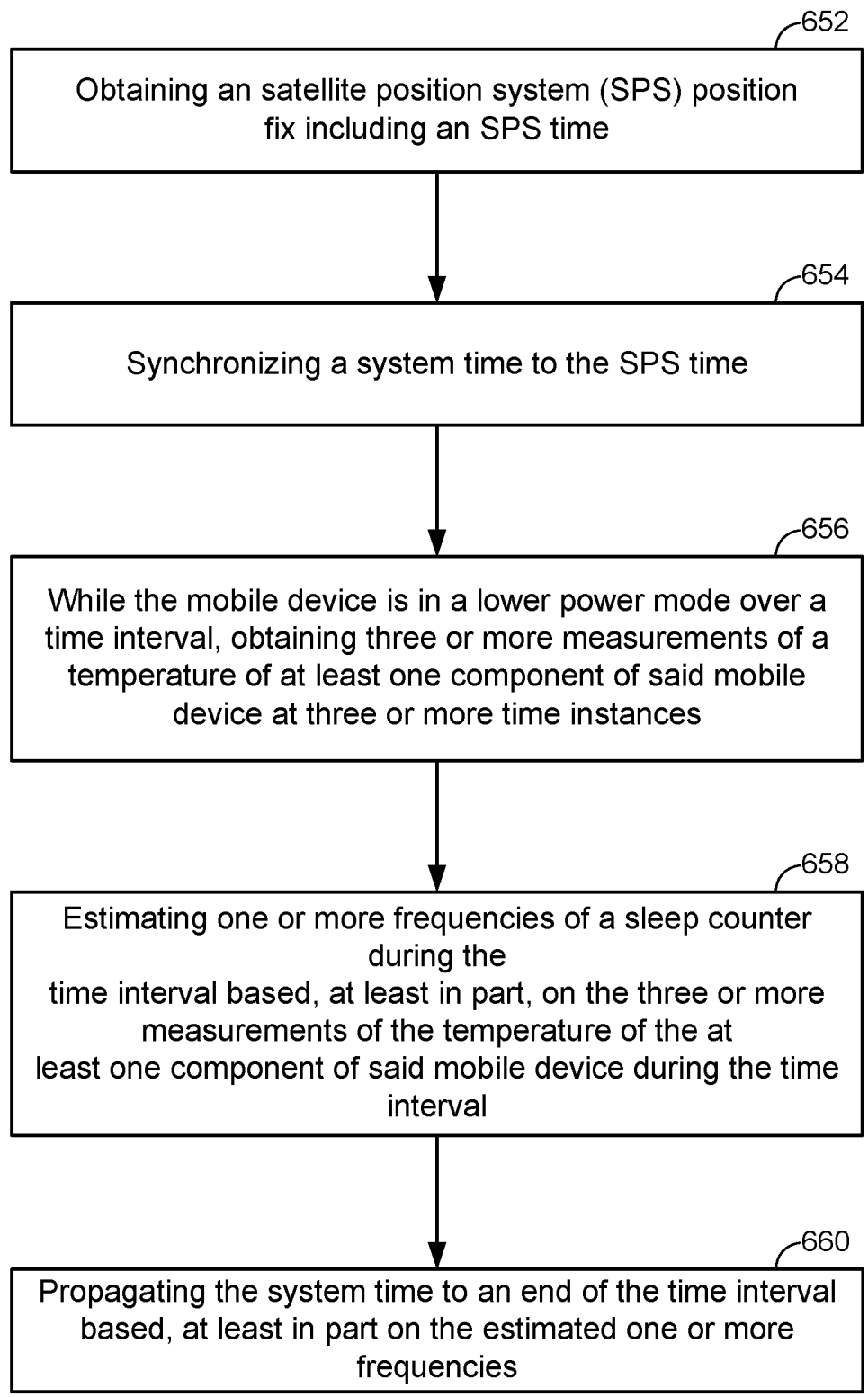
FIG. 6 is a flow diagram of a process to propagate an estimate of a satellite positioning system (SPS) time according to an embodiment.

FIG. 6 is a flow diagram of a process performed by a mobile device to propagate an estimate of a system time while the mobile device is in a lower power mode according to an embodiment. For example, such a lower power mode may occur during a period between first and second SPS position fixes. For example a first SPS position fix may be obtained at block 652 which includes an SPS time. Block 654 may then synchronize a system time maintained at the mobile device to the SPS time obtained at block 652.

As pointed out above, to obtain a subsequent SPS position fix following transition to the lower power mode, it may be desirable to establish a search window including a time dimension determined based on an accurate estimate of SPS time. Block 656 may propagate a system time synchronized at block 654 while the mobile device is in the lower power mode for use in determining a search window. The system time may be propagated using a sleep counter that is advanced by an XO crystal oscillator. To account for variations in frequency affected by fluctuations in temperature of the XO crystal oscillator, block 656 may obtain measurements of a temperature of the XO crystal oscillator at three or more time instances. Here, for example, measurements may be obtained at a transition to the lower power mode following an initial position fix, at a transition from the lower power mode back to a higher state (e.g., before obtaining a second SPS position fix), and at an instance between the transition to the lower power mode and transition back to the higher power mode.

Block 658 may estimate a frequency of a sleep counter used to propagate a system time (e.g., estimate of SPS time) based, at least in part, on measurements obtained at block 656. Block 658 may estimate an oscillation frequency of an XO crystal oscillator advancing the sleep counter according to expressions (1) or (2) above. Here, obtaining three or more measurements of temperature may enable the mobile device to more accurately account for fluctuations in temperature of an XO crystal oscillator in propagating system time. In one embodiment, the three or more measurements of temperature may be combined (e.g., averaged) to determine a representative temperature between SPS position fixes. This representative temperature may then be used to compute a representative frequency for propagating system time in one iteration. Alternatively, system time may be incrementally propagated for individual temperature measurements between the SPS position fixes. For example, system time may be propagated in any individual increment between consecutive temperature measurements based on a representative temperature during the increment. Block 660 may then propagate the system time to a transition of the mobile device to a higher power state (e.g., to acquire obtain a subsequent SPS position fix).

Figure 7A:
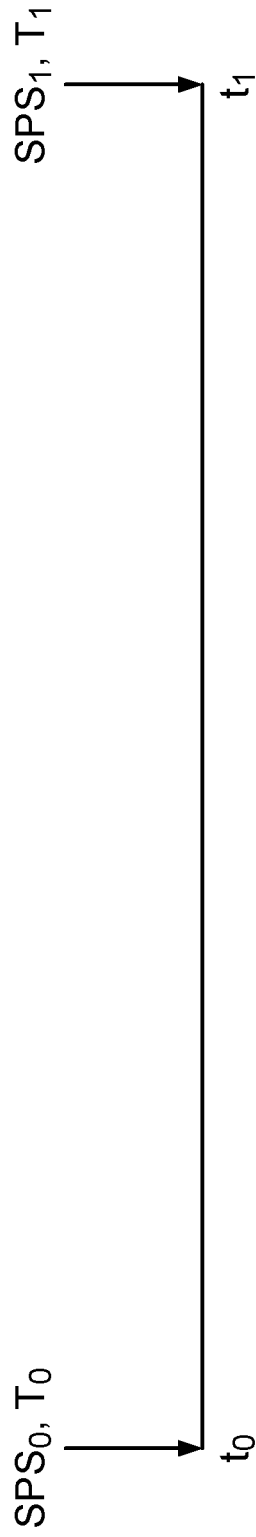
FIGS. 7A and 7B are timing diagrams illustrating times for sampling a temperature of an XO crystal oscillator according to an embodiment.
Figure 7B:
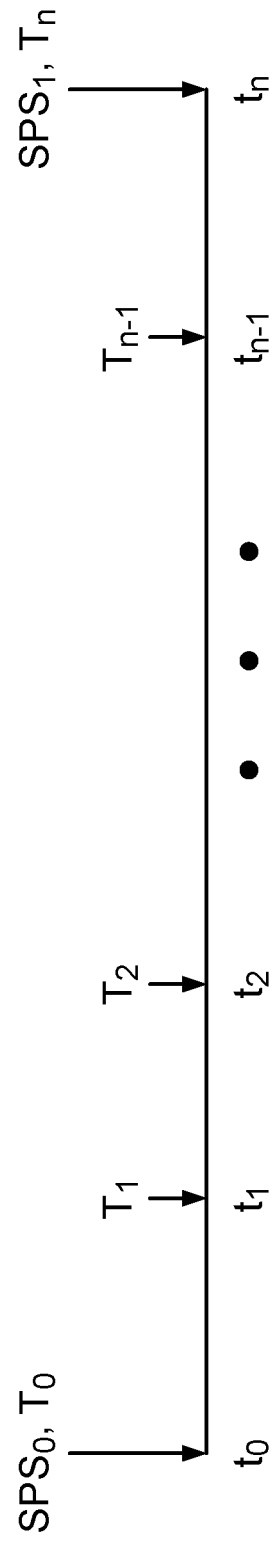

FIGS. 7A and 7B illustrate alternative techniques for measuring a temperature of an XO crystal oscillator for aiding in propagation of a system time according to an embodiment. In FIG. 7A, an initial SPS fix $SPS_0$ is obtained at a time to and a subsequent SPS fix $SPS_1$ is obtained at a time Measurements of temperature of an XO crystal oscillator $T_0$ and $T_1$ may also be obtained contemporaneously with SPS position fixes $SPS_0$ and $SPS_1$ at times $t_0$ and $t_1$ for use in estimating an oscillation frequency of the XO crystal oscillator between times $t_0$ and $t_1$ (e.g., according to expression (1) or (2) above).

In FIG. 7B, an initial SPS fix $SPS_0$ is obtained at a time to and a subsequent SPS fix $SPS_n$ is obtained at a time $t_n$. Measurements of temperature of an XO crystal oscillator $T_0$ and $T_n$ may also be obtained contemporaneously with SPS position fixes $SPS_0$ and $SPS_n$ at times $t_0$ and $t_n$. However, between times $t_0$ and $t_n$, the mobile device may obtain additional measurements of temperature of the XO crystal oscillator $T_1$ through $T_{n-1}$ for use in estimating an oscillation frequency of the XO crystal oscillator between times $t_0$ and $t_n$. These additional temperature measurements $T_1$ through $T_{n-1}$ may enable a mobile device to better account for temperature-induced fluctuations of XO crystal oscillator frequency between SPS position fixes.

In a particular implementation, temperature measurements obtained at block 656 may be combined or averaged together to generate a single value or expression characterizing a temperature of the XO crystal oscillator while in the lower power state. This single value or expression characterizing temperature of the XO crystal oscillator may then be used to compute a frequency value according to expressions (1) or (2). Block 660 may then propagate the system time between SPS position fixes in a single iteration based, at least in part, on a difference between sleep counter value read at the transition to the lower power mode and a sleep counter value read at the transition from the lower power mode to the higher power mode. For example, this difference in sleep counter states may be divided by the computed frequency value to determine an amount that the system time is to be propagated from synchronization with SPS time at block 654 to transition from the lower power mode to the higher power mode.

In one embodiment, a system time may be predicted based, at least in part, on an estimated frequency between times $t_0$ and $t_n$ according to expression (5) as follows:

$$\text{pre}(t_n) = t_0 + [C(t_n) - C(t_0)] / f_{est}(t_0, t_n), \quad (5)$$

where:

$t_0$ is a system time obtained in an initial SPS position fix;

$\text{pre}(t_x)$ is the predicted system time at the xth temperature measurement;

$C(t_x)$ is the state or value of a sleep counter at the xth temperature measurement; and $f_{est}(t_v, t_x)$ is an estimate of XO oscillator frequency in the interval $t_v$ to $t_x$.

In expression (5), a representative frequency $f_{est}(t_0, t_n)$ may be determined based, at least in part, on a combination of temperature samples $T_0$ through $T_n$. For example, temperature samples $T_0$ through $T_n$ may be combined (e.g., averaged) to determine a representative temperature between $t_0$ and $t_n$. The representative temperature may then be used to compute $f_{est}(t_0, t_n)$ (e.g., according to expression (1) or (2) above). Alternatively, a predicted or estimated system time may be incrementally propagated on consecutive temperature measurements according to expression (6) as follows:

$$\text{pre}(t_n) = t_0 + [C(t_1) - C(t_0)] / f_{est}(t_0, t_1) + [C(t_2) - C(t_1)] / f_{est}(t_1, t_2) + \ldots + [C(t_n) - C(t_{n-1})] / f_{est}(t_{n-1}, t_n) \quad (6)$$

In the particular embodiment of expression (6), to propagate an estimated or predicted system time over a smaller interval between consecutive temperature samples, XO oscillator frequency may be estimated based, at least in part, on temperature measurements at endpoints of the smaller interval. For example, consecutive temperature measurements may be averaged an applied to expression (1) or (2) for estimating XO oscillator frequency between the consecutive temperature measurements.

Figure 8:
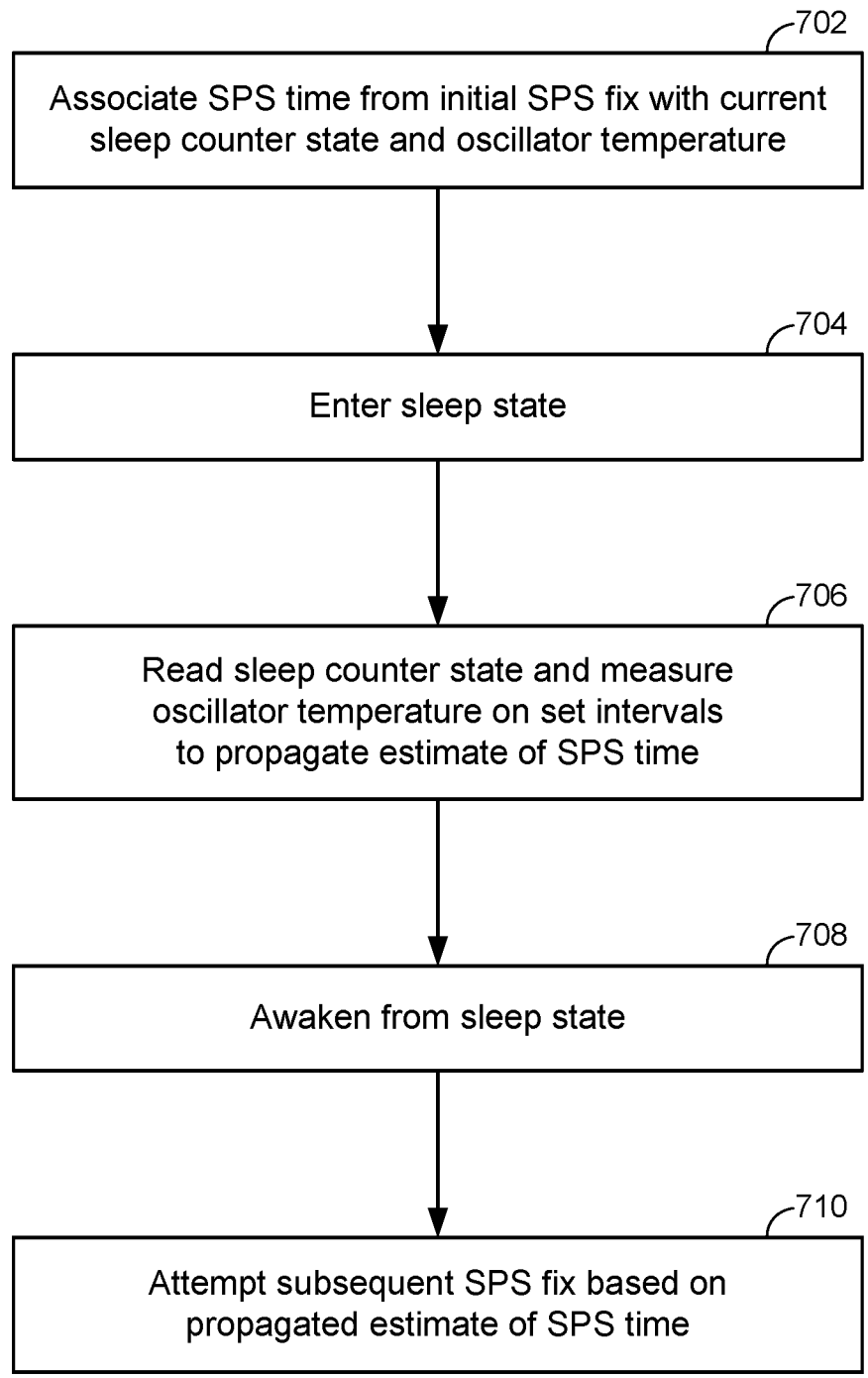
FIG. 8 is a flow diagram of a process to propagate an estimate of an SPS time according to a particular example implementation.

FIG. 8 is a flow diagram of a process performed by a mobile device to propagate an estimate of a system (e.g., SPS time) according to a particular implementation. Contemporaneous with obtaining an initial SPS position fix, block 702 may associate an SPS time obtained from the initial SPS position fix (spsTime(0)) with a current sleep counter state (N(0)) and a current temperature of an XO crystal oscillator (T(0)) used for advancing the sleep counter. In a particular implementation, N(0) may be latched with spsTime(0) as a time tag. A measured temperature of an XO crystal oscillator may also be read.

At block 702, an SPS modem and related processing of the mobile device may be fully powered. To conserve power, the mobile device may transition to a lower power mode such as a sleep state at block 704. In this lower power mode, the SPS modem and related processing may be powered down or powered off. In this lower power mode, however, the mobile device may maintain sufficient power to clock circuitry (e.g., timing circuit 260), a temperature sensor and other related processing to enable propagation of an estimate of SPS time (e.g., spsTime(n)).

At block 706, while in a lower power mode and at set intervals a mobile device may read a sleep counter state N(n) and obtain measurements of temperature of an XO crystal oscillator T(n) to propagate an estimate of SPS time spsTimeEst(n). These set intervals may be every second or a set number of seconds, for example. At a (k−1)-th second following the initial SPS position fix, an SPS time at sleep counter state N(k−1) may be used to propagate an estimate of system time as spsTimeEst(k−1). At a k-th second counter cycle, the sleep counter state may be represented as N(k) and the measured XO crystal oscillator temperature may be represented as T(k).

To estimate a time interval from N(k−1) to N(k) for use in propagating spsTimeEst(k−1) to spsTimeEst(k), a frequency of the XO crystal oscillator F(k) may be estimated according to expression (1) above based on an average temperature over the interval k−1 to k computed as (T(k)+T(k−1))/2. Based on the estimated frequency F(k), the time interval from N(k−1) to N(k) may be computed as (N(k)−N(k−1))/F(k). An estimate of SPS time may then be propagated according to expression (7) as follows:

$$\text{spsTime}(k) = \text{spsTime}(k-1) + (N(k) - N(k-1))/F(k) \quad (7)$$

At block 708, the mobile device may awaken from its sleep state or lower power mode in response to a particular event such as, for example, a scheduled subsequent SPS position fix. The mobile device may then attempt the subsequent SPS position fix at block 710 using the estimated SPS time propagated at block 706. As pointed out above, a mobile device may establish a search window for acquiring SPS signals having a time dimension. This time dimension may be based, at least in part, on an estimate of SPS time and an uncertainty about the estimate of SPS time. As the mobile device awakens at sleep counter cycle n (e.g., at block 708), the mobile device may propagate the most recent estimate of SPS time based on a current temperature of the XO crystal oscillator.

In other implementations, an uncertainty in spsTimeEst may further be used in determining a time dimension of a search window for acquiring an SPS signal. Here, in setting a time search window for acquisition of SPS signals to provide the subsequent SPS position fix, an uncertainty in the propagated estimate SPS time spsTime(k) may be determined based, at least in part, on an uncertainty in F(k). According to a particular implementation, an uncertainty of the F(k) may be determined from a stored look-up table and represented here as dF(k) (e.g., in ppm). According to an embodiment, an uncertainty in a propagated estimate of SPS time may be determined according to expression (8) as follows:

$$\text{UncGpsTime}(k) = \text{UncGpsTime}(k-1) + (N(k) - N(k-1))/F(k) * dF(k) \quad (8)$$

In other implementations, additional sources of error may be considered in determining a search window. Such additional sources of error may include, for example, an error in an a SPS time obtained in an initial SPS position fix before entering a sleep state at block 704, and an uncertainty in reading of sleep counter states and errors in estimates of XO crystal oscillation frequency at set intervals to propagate spsTimeEST at block 706.

One particular systematic source of error may arise from estimating a frequency of an XO crystal oscillator solely based on temperature (e.g., according to expressions (1) or (2)). For example, a changing load capacitance in a lower power mode may introduce a bias that distorts estimates of frequency according to expressions (1) or (2). For example, 1.0 ppm bias can result in 1.0 µs/s error. The above procedure can estimate this 1 ppm bias, thus remove the 1 us/s error. According to an embodiment, such a bias may be estimated following block 710 by comparing an SPS time obtained from a subsequent SPS fix with the propagated estimate of SPS time. This bias may then be applied in propagating system time following block 710 while subsequent In one example, at a propagated system time contemporaneous with a subsequent SPS fix at block 710 may be 1.0000015 s. If an SPS time obtained in the subsequent SPS fix is 1.0000000 s, then a 1.5 µs bias error may be determined as a difference between the propagated estimate SPS time and the SPS time obtained in the subsequent SPS position fix. This bias error may then be expressed as an error rate of 1.5 µs/s, and may be used in combination with techniques to propagate an SPS time in while in a sleep state subsequently to block 710. In other implementations, this error rate may updated or combined with future error rate computations determined on future SPS position fixes occurring as the device awakens from future durations in a sleep state.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "maintaining," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A mobile device operable in a plurality of power modes, the mobile device comprising:
   a satellite positioning system (SPS) receiver;
   a timing circuit comprising a sleep counter; and
   one or more processors configured to:
      obtain an SPS time based, at least in part, on an SPS position fix at the SPS receiver;
      set a system time of the mobile device to the SPS time;
      obtain three or more measurements of a temperature of at least one component of the mobile device at three or more time instances, the three or more measurements including a first measurement, a second measurement, and a third measurement, the second measurement being between the first measurement and the third measurement and being during a lower-power time interval during which the mobile device is in a lower-power mode;

determine one or more estimated frequencies of the sleep counter based, at least in part, on the three or more measurements of the temperature of the at least one component of the mobile device; and propagate the system time maintained at the mobile device to an end of the lower-power time interval based, at least in part, on the one or more estimated frequencies.

2. The mobile device of claim 1, wherein the one or more processors are configured to obtain the first measurement and the third measurement during the lower-power time interval.

3. The mobile device of claim 1, wherein the one or more processors are further configured to:

estimate a rate of change in the temperature based, at least in part, on at least two of the three or more measurements; and affect a rate at which the three or more measurements are to be obtained based, at least in part, on the rate of change in the temperature.

4. The mobile device of claim 3, wherein the one or more processors are further configured to increase the rate at which the three or more measurements are to be obtained in response to detection of an increase in the rate of change in the temperature.

5. The mobile device of claim 3, wherein the one or more processors are further configured to decrease the rate at which the three or more measurements are to be obtained in response to detection of a decrease in the rate of change in the temperature.

6. The mobile device of claim 1, wherein the one or more processors are further configured to compute an average temperature of the at least one component of the mobile device based, at least in part, on a combination of the three or more measurements of the temperature, wherein the one or more processors are configured to determine the one or more estimated frequencies based, at least in part, on the average temperature.

7. The mobile device of claim 1, wherein the one or more processors are further configured to:

read a first sleep counter state and obtain the first measurement at a first time instance of the three or more time instances;

read a second sleep counter state and obtain the second measurement at a second time instance of the three or more time instances;

propagate the system time from the first time instance to the second time instance based, at least in part, on a difference between the first sleep counter state and the second sleep counter state, the first measurement and the second measurement;

read a third sleep counter state and obtain the third measurement at a third time instance of the three or more time instances; and propagate the system time from the second time instance to the third time instance based, at least in part, on a difference between the second sleep counter state and the third sleep counter state, the second measurement and the third measurement.

8. The mobile device of claim 7, wherein the one or more processors are further configured to initiate acquisition of an SPS signal based, at least in part, on the system time propagated from the second time instance to the third time instance.

9. The mobile device of claim 1, wherein the at least one component comprises a crystal oscillator to advance a state of the sleep counter at the one or more estimated frequencies.

10. The mobile device of claim 1, wherein the one or more processors are further configured to adjust a rate of measurements of the temperature of the at least one component in response to a change in power status of a heat-producing component of the mobile device.

11. The mobile device of claim 10, wherein the one or more processors are configured to adjust the rate of measurements of the temperature by increasing the rate of measurements of the temperature in response to a processor awakening from a sleep state.

12. A mobile device operable in a plurality of power modes, the mobile device comprising:

means for obtaining a satellite positioning system (SPS) time based, at least in part, on an SPS position fix;

means for setting a system time of the mobile device to the SPS time;

means for obtaining three or more measurements of a temperature of at least one component of the mobile device at three or more time instances, the three or more measurements including a first measurement, a second measurement, and a third measurement, the second measurement being between the first measurement and the third measurement and being during a lower-power time interval during which the mobile device is in a lower-power mode;

means for determining one or more estimated frequencies of a sleep counter of the mobile device based, at least in part, on the three or more measurements of the temperature of the at least one component of the mobile device; and means for propagating the system time maintained at the mobile device to an end of the lower-power time interval based, at least in part, on the one or more estimated frequencies.

13. The mobile device of claim 12, wherein the means for obtaining three or more measurements are for obtaining the first measurement and the third measurement during the lower-power time interval.

14. The mobile device of claim 12, further comprising:

means for estimating a rate of change in the temperature based, at least in part, on at least two of the three or more measurements; and means for affecting a rate at which the three or more measurements are to be obtained based, at least in part, on the rate of change in the temperature.

15. The mobile device of claim 14, wherein the means for affecting the rate at which the three or more measurements are to be obtained are for increasing the rate at which the three or more measurements are to be obtained in response to detection of an increase in the rate of change in the temperature.

16. The mobile device of claim 14, wherein the means for affecting the rate at which the three or more measurements are to be obtained are for decreasing the rate at which the three or more measurements are to be obtained in response to detection of a decrease in the rate of change in the temperature.

17. The mobile device of claim 12, further comprising means for computing an average temperature of the at least one component of the mobile device based, at least in part, on a combination of the three or more measurements of the temperature, wherein the means for determining one or more estimated frequencies of the sleep counter are for determining the one or more estimated frequencies based, at least in part, on the average temperature.

18. The mobile device of claim 12, wherein the means for obtaining the three or more measurements and the means for propagating the system time respectively comprise:
   means for reading a first sleep counter state to obtain the first measurement at a first time instance of the three or more time instances;
   means for reading a second sleep counter state to obtain the second measurement at a second time instance of the three or more time instances;
   means for propagating the system time from the first time instance to the second time instance based, at least in part, on a difference between the first sleep counter state and the second sleep counter state, the first measurement and the second measurement;
   means for reading a third sleep counter state to obtain the third measurement at a third time instance of the three or more time instances; and
   means for propagating the system time from the second time instance to the third time instance based, at least in part, on a difference between the second sleep counter state and the third sleep counter state, the second measurement and the third measurement.

19. The mobile device of claim 18, further comprising means for initiating acquisition of an SPS signal based, at least in part, on the system time propagated from the second time instance to the third time instance.

20. The mobile device of claim 12, wherein the at least one component comprises a crystal oscillator to advance a state of the sleep counter at the one or more estimated frequencies.

21. The mobile device of claim 12, further comprising means for adjusting a rate of measurements of the temperature of the at least one component in response to a change in power status of a heat-producing component of the mobile device.

22. The mobile device of claim 21, wherein the means for adjusting the rate of measurements of the temperature are for adjusting the rate of measurements of the temperature by increasing the rate of measurements of the temperature in response to a processor awakening from a sleep state.

23. A non-transitory, processor-readable storage medium comprising instructions configured to cause one or more processors of a mobile device to:
   obtain a satellite positioning system (SPS) time based, at least in part, on an SPS position fix;
   set a system time of the mobile device to the SPS time;
   obtain three or more measurements of a temperature of at least one component of the mobile device at three or more time instances, the three or more measurements including a first measurement, a second measurement, and a third measurement, the second measurement being between the first measurement and the third measurement and being during a lower-power time interval during which the mobile device is in a lower-power mode;
   determine one or more estimated frequencies of a sleep counter of the mobile device based, at least in part, on the three or more measurements of the temperature of the at least one component of the mobile device; and
   propagate the system time maintained at the mobile device to an end of the lower-power time interval based, at least in part, on the one or more estimated frequencies.

24. The storage medium of claim 23, wherein the instructions configured to cause the one or more processors to obtain the three or more measurements are configured to cause the one or more processors to obtain the first measurement and the third measurement during the lower-power time interval.

25. A method comprising:
   obtaining, at a mobile device, a satellite positioning system (SPS) time based, at least in part, on an SPS position fix;
   setting a system time of the mobile device to the SPS time;
   obtaining three or more measurements of a temperature of at least one component of the mobile device at three or more time instances, the three or more measurements including a first measurement, a second measurement, and a third measurement, the second measurement being between the first measurement and the third measurement and being during a lower-power time interval during which the mobile device is in a lower-power mode;
   determining one or more estimated frequencies of a sleep counter of the mobile device based, at least in part, on the three or more measurements of the temperature of the at least one component of the mobile device; and
   propagating the system time maintained at the mobile device to an end of the lower-power time interval based, at least in part, on the one or more estimated frequencies.

26. The method of claim 25, wherein obtaining the three or more measurements comprises obtaining the first measurement and the third measurement during the lower-power time interval.

* * * * *